US011796312B2

(12) United States Patent
Tadele et al.

(10) Patent No.: US 11,796,312 B2
(45) Date of Patent: Oct. 24, 2023

(54) BODY VOLUME/SHAPE DETERMINATION USING HANDHELD DEVICES

(71) Applicant: Apple Inc., Cupertino, CA (US)

(72) Inventors: Wegene H. Tadele, San Francisco, CA (US); Albert Wang, Sunnyvale, CA (US); Motohide Hatanaka, Menlo Park, CA (US); Nicholas R. Trincia, San Francisco, CA (US); William K. Smith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 17/482,319

(22) Filed: Sep. 22, 2021

(65) Prior Publication Data
US 2023/0086268 A1    Mar. 23, 2023

(51) Int. Cl.
*G01B 17/06* (2006.01)
*G01S 5/30* (2006.01)

(52) U.S. Cl.
CPC ............ *G01B 17/06* (2013.01); *G01S 5/30* (2013.01)

(58) Field of Classification Search
CPC .. G01S 5/30; G01B 17/06; G01B 7/02; G01B 7/28; A61B 8/4488
USPC ........................................................ 600/447
See application file for complete search history.

(56) References Cited

U.S. PATENT DOCUMENTS

| 9,689,958 B1 * | 6/2017 | Wild ....................... G01S 1/751 |
| 10,078,135 B1 * | 9/2018 | Almada .................... G01S 5/30 |
| 2014/0012149 A1 * | 1/2014 | Trice ..................... A61B 5/0022 600/528 |
| 2021/0157394 A1 * | 5/2021 | Huang ............... G02B 27/0172 |

OTHER PUBLICATIONS

Zhi et al., "A Method of 3D Point Cloud vol. Calculation Based on Slice Method", (2016), International Conference on Intelligent Control and Computer Application (ICCA 2016), 155-158 (Year: 2016).*
Zhou et al., "LimbMotion: Decimeter-level Limb Tracking forWearable-based Human-Computer Interaction", (2019), Proc. ACM Interact. Mob. Wearable Ubiquitous Technol., vol. 3, No. 4, Article 161 (Year: 2019).*
Palipana et al., "Pantomime: Mid-Air Gesture Recognition with Sparse Millimeter-Wave Radar Point Clouds", (Mar. 2021), Proc. ACM Interact. Mob. Wearable Ubiquitous Technol., vol. 5, No. 1, Article 27 (Year: 2021).*
Chen and Liu, "Navigable Space Construction from Sparse Noisy Point Clouds", (2021), IEEE Robotics and Automation Letters, vol. 6, No. 3, Jul. 2021 (Year: 2021).*

(Continued)

*Primary Examiner* — Yuqing Xiao
*Assistant Examiner* — Christopher Richard Walker
(74) *Attorney, Agent, or Firm* — BAKERHOSTETLER

(57) ABSTRACT

Aspects of the subject technology relate to a system including a reference device, a measurement device and a processor. The measurement device provides a three-dimensional (3-D) point map corresponding to first positions of a plurality of selected points on a torso of a user. The processor determines a shape of the torso based on the 3-D point map. The measurement device is sequentially placed on the plurality of selected points, and the 3-D point map represents the first positions of the plurality of selected points relative to a second position associated with a location in 3-D space of the reference device.

22 Claims, 5 Drawing Sheets

(56) References Cited

OTHER PUBLICATIONS

Xu et al., "A Review: Point Cloud-Based 3D Human Joints Estimation", (2021), Sensors, 21, 1684 (Year: 2021).*
Gumhold et al., "Feature Extraction from Point Clouds", (2001), Proceedings of 10th International Meshing Roundtable (Year: 2001).*

* cited by examiner

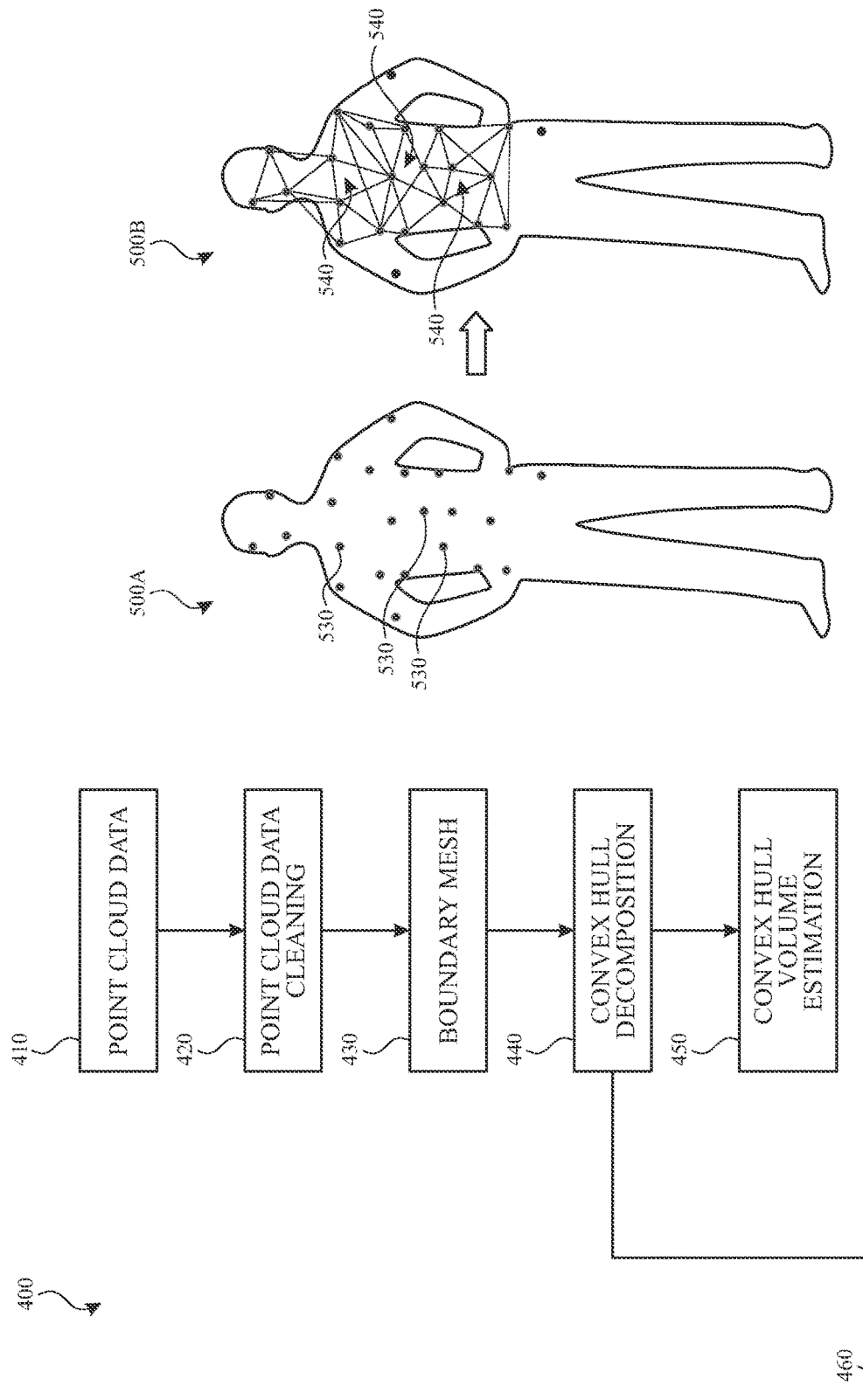

US 11,796,312 B2

BODY VOLUME/SHAPE DETERMINATION USING HANDHELD DEVICES

TECHNICAL FIELD

The present description relates generally to handheld electronic devices and, more particularly, but not exclusively, to body volume/shape determination using handheld devices.

BACKGROUND

Acquiring the volume of a person typically requires a dedicated optical system to map out the person's body. The most accurate hardware used for determining a person's volume is large, complex and/or cumbersome, making it difficult to integrate into small consumer electronic devices that are convenient for users. Thus, there is a tradeoff between the ease of use and measurement capabilities. There is a need for a new method to perform on-demand and continuous body-volume measurement using a handheld device such as a communication device or a wearable device, for example a smartwatch, a smartphone, headphones, a headset, a smart tag or a headphone case.

BRIEF DESCRIPTION OF THE DRAWINGS

Certain features of the subject technology are set forth in the appended claims. However, for purposes of explanation, several aspects of the subject technology are set forth in the following figures.

FIG. 4 illustrates a flow chart illustrating an example process for using hand-held devices for body volume and/or shape determination, in accordance with various aspects of the subject technology.

FIGS. 5A and 5B illustrate an example user's body showing a set of measured three-dimensional points and a set of triangular surfaces used for body volume and/or shape determination, in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

The subject disclosure is directed to body volume and/or shape determination using portable devices, for example wearable and/or handheld devices such as smartwatches, smartphones, headphones, headsets, smart tags, headphone cases and so forth. The disclosed technology provides methods and systems to perform on-demand and continuous body-volume measurement using the portable devices. In some aspects, the subject technology provides a system to calculate user torso volume from multiple hand-held and/or wearable devices. In one or more aspects, a moving measurement device such as a smartwatch having an inertial-measurement unit (IMU) (e.g., an accelerometer and a gyroscope) can be used to build a point-cloud map of a user's torso. In some aspects, a reference static (fixed) device with an IMU that is attached to (e.g., worn on) the user's body or placed in the vicinity of the user can be employed to calibrate out an error arising from double integration of the accelerometer data. This would allow for the obtaining of distance from the moving measurement device such as a smartwatch, a smart phone, an earbud, a headphone or a headset.

In one or more aspects, the disclosed method uses a fixed linkage of a limb (e.g., an arm), obtained from a manually entered length in an accompanying application (app) or automatically determined using an acoustic transducer integrated into the moving measurement device, to determine torso volume. The fixed linkage of the limb can be fed into an algorithm to extract the torso-region volume accurately. The algorithm acquires a set of device measurements and sensor outputs captured by the moving device and a reference device, and it infers the volume measurements based on the data input from the IMU or radiofrequency (RF) sensors and acoustic transducers. A data pipeline mechanism may connect the body-volume data into health metrics and cloth-sizing apps. The body volume and/or shape determination of the subject technology can be used in a number of apps, such as long-term body-size tracking for health apps and body-size measurement for cloth fitting and online shopping.

Figure 1A:
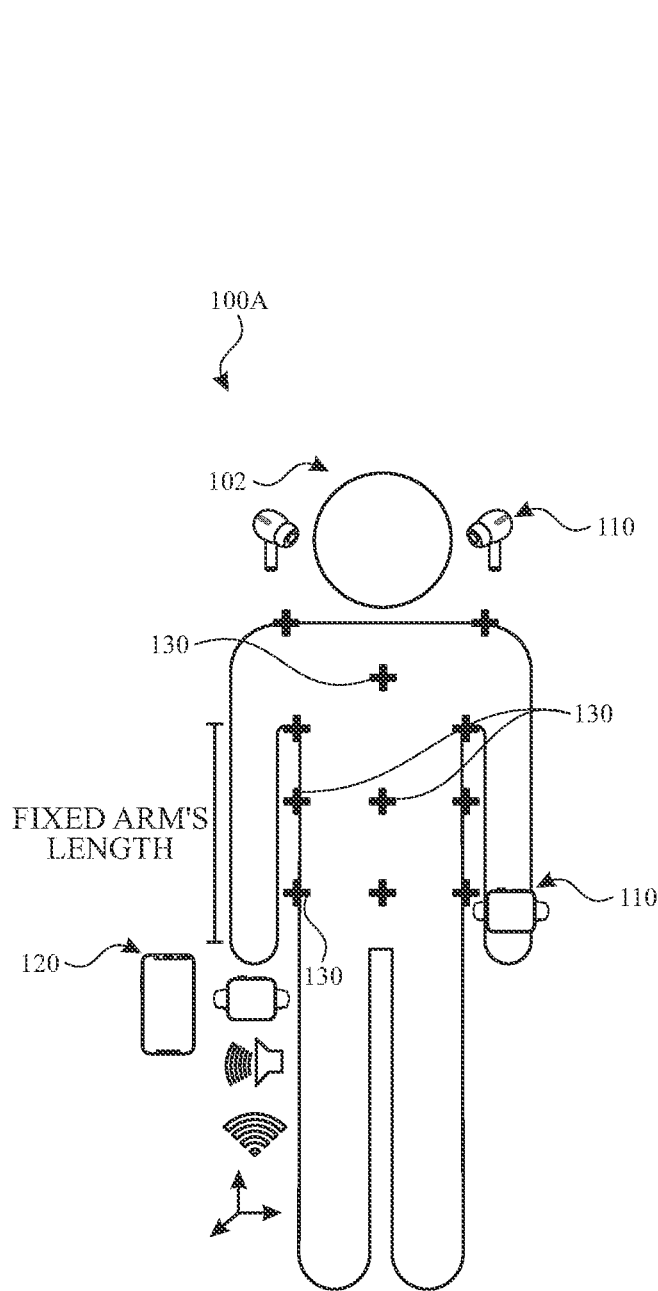
FIG. 1A is a schematic diagram illustrating an example system for using hand-held devices to determine body volume and/or shape, in accordance with various aspects of the subject technology.

FIG. 1A is a schematic diagram illustrating an example system 100A for using handheld devices to determine body volume and/or shape, in accordance with various aspects of the subject technology. The example system 100A includes a reference device 110 and a measurement device 120. The reference device 110 is a static portable (e.g., hand-held) communication device fixed on the body of a user 102. In some implementations, the reference device 110 can be a smartwatch or an earbud worn by the user 102 or an earbud case. In one or more implementations, the measurement device (moving device) 120 can be a portable (e.g., hand-held) communication device such as a smartphone, a smartwatch or a smart sensor device equipped with an IMU. The user 102 can place the measurement device 120 on a number of designated locations 130 indicated by (+) signs. The designated locations 130 are chosen to properly map the torso of the user 102. Clearly, the accuracy of the volume/shape measurement of the torso depends on, among other factors, the count of the designated locations 130 on the torso. The larger the number of measurement points, the more accurate the volume/shape measurement will be. The measured points collected by placing the measurement device on the designated locations 130 provide a three-dimensional (3-D) point cloud map of the torso of the user 102.

Figure 1B:
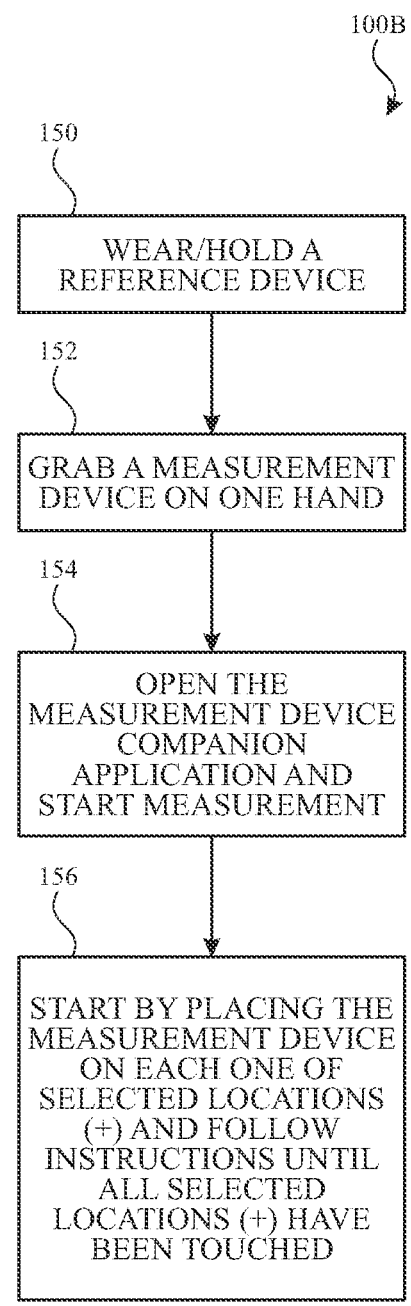
FIG. 1B is a flow diagram illustrating an example method of using handheld devices to determine body volume and/or shape, in accordance with various aspects of the subject technology.

FIG. 1B is a flow diagram illustrating an example method 100B of using portable devices to determine body volume and/or shape, in accordance with various aspects of the subject technology. The method 100B starts at operation block 150, where the user 102 wears or holds the reference device 110. The user 102 can wear, for example, a smartwatch on her/his wrist (e.g., left wrist) or earbuds that can be used as a reference device. In some implementations, the user 102 may hold a portable (e.g., handheld) communication device such as a smartphone with her/his left hand as a reference device 110. At operation block 152, the user 102 grabs the measurement device 120 with another hand (e.g., right hand). At operation block 154, the user 102 opens a companion app installed on the measurement device 120 and gets ready to start the measurement. At this point, the measuring device 120 can send acoustic signals along the user's arm (e.g., right arm) and measure reflected signals to determine the length of the arm using an acoustic time of flight from the reflected signals. At operation block 156, the user 102 starts the measurement by placing the measurement device 120 on each of the designated locations 130 (+) and follows instructions provided by the app until all designated locations 130 have been touched by the measurement device 120. The measurements performed by the measurement device 120 produce input data for an algorithm used by the app. The algorithm can infer or determine the user's torso volume based on the measurement data.

Figure 2:
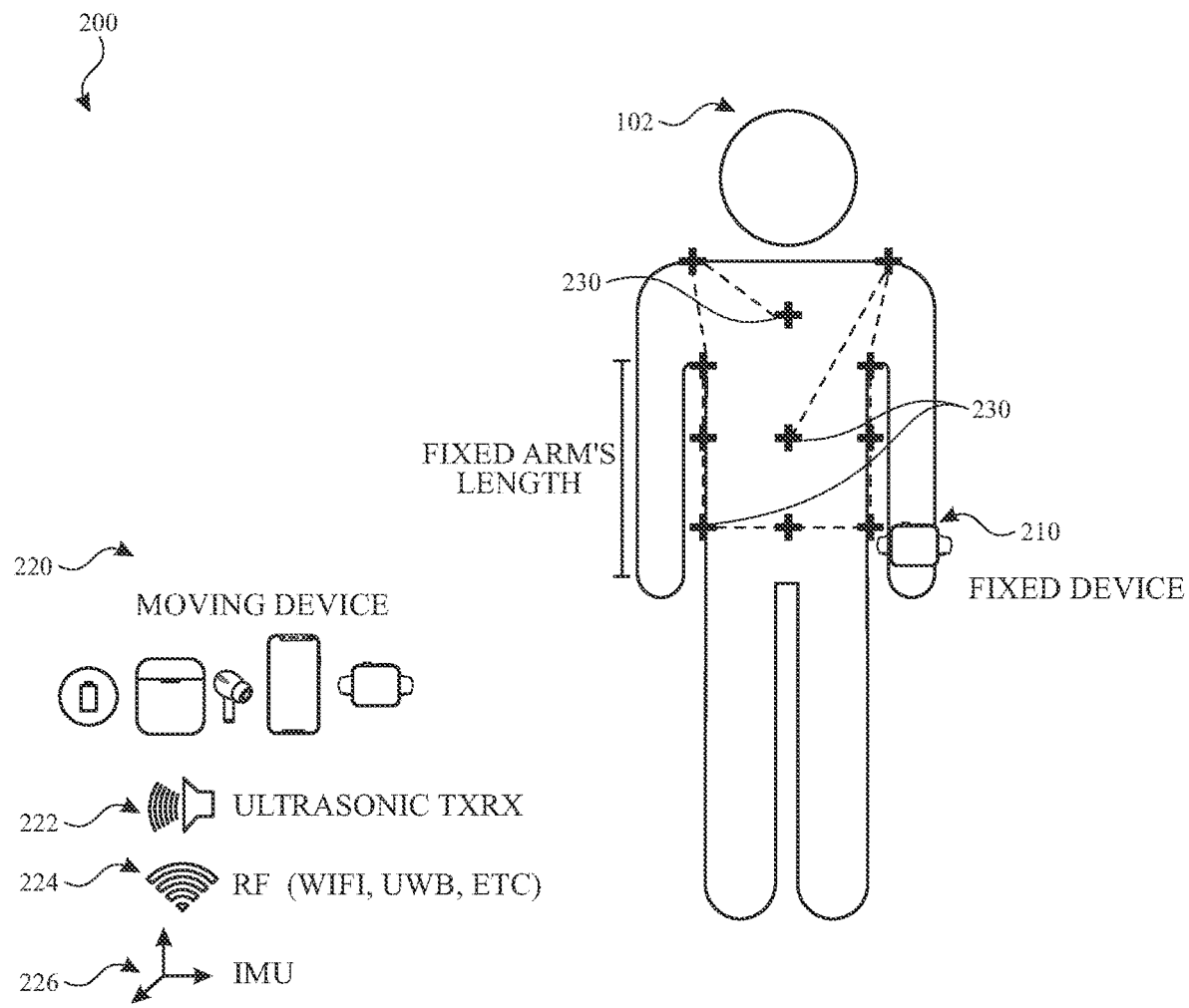
FIG. 2 is a schematic diagram illustrating an example method of using hand-held devices, including a reference device fixed on a user's body for body volume and/or shape determination, in accordance with various aspects of the subject technology.

FIG. 2 is a schematic diagram illustrating an example system 200 for using portable devices, including a reference device fixed on a user's body for body volume and/or shape determination, in accordance with various aspects of the subject technology. The system 200 is similar to the system 100 of FIG. 1A except that the measurement device 220 includes more devices, as explained herein. The reference device 210 is a fixed device such as a smartwatch worn on a wrist (e.g., left wrist) of the user 210 or a smartphone held by the same hand of the user 102. The measurement device 220 is a moving device and can be any portable smart device or sensor such as a smartphone, a smartwatch, an earbud, an earbud case or an airtag. In some implementations, the measurement device 220 may include a number of sensors, for example an ultrasonic transceiver 222, an RF device 224 such as a Wi-Fi device or an ultra-wideband (UWB) device, and a sensor device 226 such as an IMU-equipped sensor device. The measurement device 220 is moved between the designated locations 320 to obtain a 3-D point cloud map, as discussed above with respect to the method 100B of FIG. 1B. The 3-D point cloud map is a set of data points that include a distance (length), an angle (rotation) and a direction of movement of the measurement device 220 with respect to the reference device 210. The accuracy of the volume/shape determined by this measurement is partly determined by the count of the data points of the 3-D point cloud map.

Figure 3:
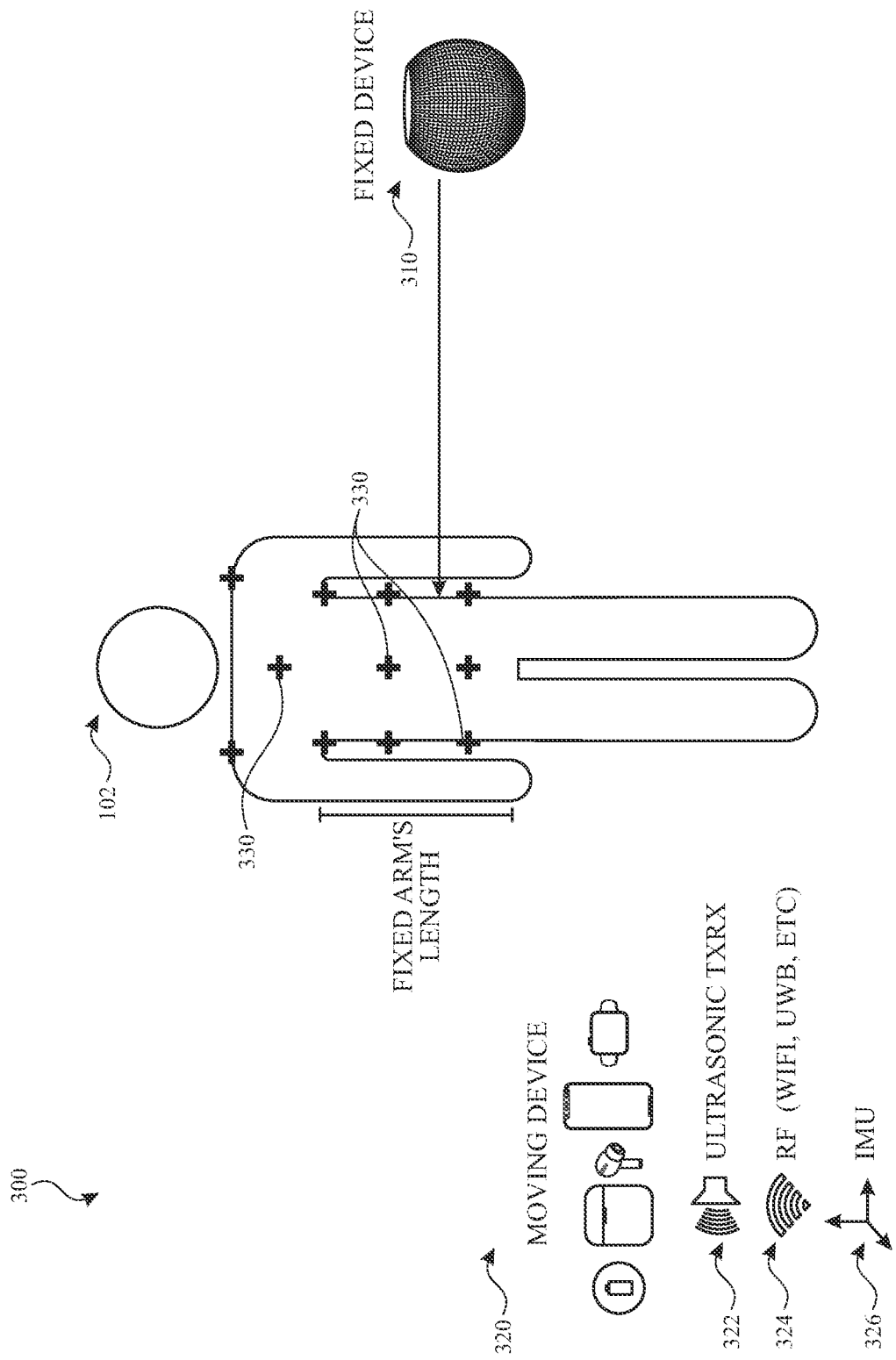
FIG. 3 is a schematic diagram illustrating an example system for using hand-held devices, including a reference device at a distance from a user for body volume and/or shape determination, in accordance with various aspects of the subject technology.

FIG. 3 is a schematic diagram illustrating an example system 300 for using hand-held devices, including a reference device at a distance from a user for body volume and/or shape determination, in accordance with various aspects of the subject technology. The system 300 is similar to the system 100 of FIG. 1A and includes a reference (fixed) device 310 and a measurement (moving) device 320. In the system 300, the reference device 310 is placed at a fixed point at a distance from the user 102 instead of being held or worn by the user 102. In some implementations, more than one reference device may be used. The reference device 310 can be any portable smart device with IMU, such as a smartwatch or a smartphone. The measurement device 320 can be a smartphone, a smartwatch, an earbud, an earbud case or an airtag. In some implementations, the measurement device 320 may include an ultrasonic transceiver 322, an RF device 324 such as a Wi-Fi device or an UWB device, and a sensor device 326 such as an IMU-equipped sensor device. The measurement device 320 is moved between the designated locations 330 to obtain a 3-D point cloud map, as discussed above with respect to the method 100B of FIG. 1B, based on which an algorithm calculates body volume/shape of the user 102. The accuracy of the volume/shape measurement is partly determined by the count of the data points of the 3-D point cloud map and the number of sensors in the measurement device 320.

The MU sensors are the minimum set of sensors that need to be used for the measurement device 320 involved in volume measurement. The relative distance and rotation information are used to build the 3-D map of the user's torso. The reference device 310 can be on-body (e.g., 210 of FIG. 2) or offs-body (e.g., 310). The UMB sensors provide ranging and direction information with mm-level resolution. Integrating UWB sensors not only provides an accurate length information, but it can also provide relative directions. The measurements will be estimated based on various signals, for example a time-of-arrival signal, an angle-of-arrival signal, a received-signal-strength signal and a time-difference-of-arrival signal at various locations (e.g., designated locations 330) in the body of the user. The Wi-Fi or Bluetooth (BT) device can be embedded in the measurement device 320 or the reference device 310, Using the Wi-Fi or BT device, a received-signal-strength indicator (RSSI) signal can be obtained to detect the presence or absence of an obstruction. Additionally, the strength of the signals measured by the measuring device 320 relative to the reference device 310 can be used to estimate the distance between the transmitters and receivers. This allows the measurement device 320 to be able to estimate its position relative to the reference device(s). An acoustic sensor having a transmitter and receiver can also be used to determine body joint locations as well as relative distance between measurement and reference devices using the time of arrival of ultrasound signals traveling from the transmitter to the receivers.

The measurements discussed above were used for obtaining the shape/volume of the user's torso. Regarding the limbs (hands and legs), the dimensions such as length, joint height and weight can be manually input into the app. Alternatively, the system 300 can automatically detect or measure the length of the limbs and joint locations by using the acoustic transceiver and examining the magnitude of the reflected signals and time of flight. This gives the relative locations of the joints and the length of each segment in the limbs.

FIG. 4 is a flow chart illustrating an example process 400 for using portable devices for body volume and/or shape determination, in accordance with various aspects of the subject technology. The process 400 is the shape-reconstruction algorithm used by the app to determine the body volume and/or shape of a user (e.g., the user 102 of FIG. 3) based on the obtained 3-D point cloud map, as discussed above. The process 400 starts at operation block 410, where a set of measured 3-D points of the 3-D point cloud map in X-Y-Z space is stored. At operation block 420, the set of measured 3-D points is cleaned by filtering the outlier signals due to measurement noise and/or imperfection. The filtering can be performed by using an available cleaning algorithm or a Matlab function. At operation block 430, a boundary mesh consisting of a set of triangles is prepared. The set of triangles represent a surface that the 3-D X-Y-Z points enclose. This surface provides a partition by defining an inside-versus-outside separation. An existing algorithm such as the Marching Cubes Algorithm or Regularized Tetrahedrons Algorithm or a Matlab function can be used to prepare the boundary mesh.

At operation block 440, a convex hull decomposition is performed by forming a set of convex hulls (polyhedrons) that make up the boundary mesh surface. The set of convex hulls can be helpful because the overall boundary is likely to not be a convex surface, which makes volume estimation more challenging. Approximate convex decomposition algorithms can be used to perform the convex hull decomposition. At operation block 450, convex hull estimation is performed by summing up volume estimates of each convex hull in the decomposition step to arrive at an overall body-volume estimate. Although there are volume-estimation algorithms available, for simpler 3-D cases it may be easier to perform the following steps: (1) pick a point in a convex hull; (2) identify all tetrahedrons formed between a triangle on a convex hull and a point chosen in step 1; and (3) add together volumes of all tetrahedrons formed in step 2.

At operation block 460, which is a measurement generation step, body measurements from convex hull shapes are estimated. For simple 3-D cases, the following steps can be performed: (1) generate the boundary mesh from the decomposition with fixed planes corresponding to body shape measurement sites (e.g., where a doctor would place a body tape measure to determine torso size); (2) identify all mesh segments that lie on the chosen fixed plane; and (3) add together the lengths of all mesh segments formed in step 2. In one or more aspects, the process 400 can be implemented in the reference device (e.g., 110 of FIG. 1A), the measurement device (e.g., 120 of FIG. 1A) or a third device that can aggregate the data from the reference device and the measurement device to output the 3D point cloud and/or anthropometric data of the user. This data can then be further linked into a down-stream software application for display to the user or to be used for other applications.

FIGS. 5A and 5B illustrate an example user's body showing a set of measured 3-D points and a set of triangular surfaces used for body volume and/or shape determination, in accordance with various aspects of the subject technology. FIG. 5A shows a set of 3-D points 530 that were touched by the measurement device (e.g., 320 of FIG. 3), and corresponding measurements with respect to the reference device (e.g., 310 of FIG. 3) were performed. FIG. 3B shows a set of triangular surfaces 540 that represent the boundary meshes discussed above with respect to FIG. 4.

Figure 6:
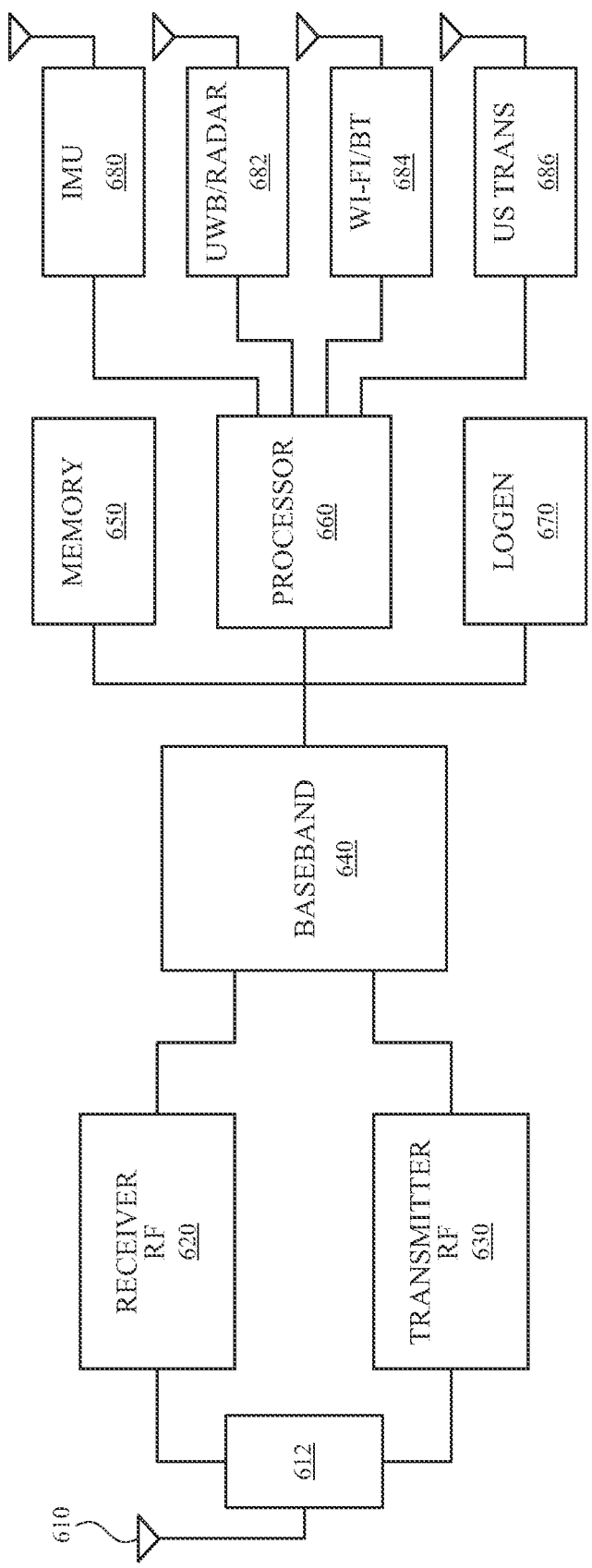
FIG. 6 illustrates a wireless communication device within which some aspects of the subject technology are implemented.

FIG. 6 illustrates a wireless communication device 600 within which some aspects of the subject technology are implemented. In one or more implementations, the wireless communication device 600 can be a tablet, a smartphone, a smartwatch, an airtag, an earbud, an earbud case or other electronic device that may be used as a reference device (e.g., 110, 210 or 310 of FIGS. 1A, 2 and 3, respectively) or a measurement device (e.g., 120, 220 or 320 of FIGS. 1A, 2 and 3, respectively) of the subject technology. The wireless communication device 600 may comprise an RF antenna 610, a duplexer 612, a receiver 620, a transmitter 630, a baseband processing module 640, a memory 650, a processor 660, a local oscillator generator (LOGEN) 670, an IMU sensor 680, a UWB/radar sensor 682, a Wi-Fi/BT sensor 684 and an ultrasonic transducer 686. In various aspects of the subject technology, one or more of the blocks represented in FIG. 6 may be integrated on one or more semiconductor substrates. For example, the blocks 620-670 may be realized in a single chip, a single system on a chip, or in a multichip chipset.

The receiver 620 may comprise suitable logic circuitry and/or code that may be operable to receive and process signals from the RF antenna 610. The receiver 620 may, for example, be operable to amplify and/or downconvert received wireless signals. In various aspects of the subject technology, the receiver 620 may be operable to cancel noise in received signals and may be linear over a wide range of frequencies. In this manner, the receiver 620 may be suitable for receiving signals in accordance with a variety of wireless standards such as Wi-Fi, WiMAX, BT, and various cellular standards. In various aspects of the subject technology, the receiver 620 may not use any sawtooth acoustic wave filters and few or no off-chip discrete components such as large capacitors and inductors.

The transmitter 630 may comprise suitable logic circuitry and/or code that may be operable to process and transmit signals from the RF antenna 610. The transmitter 630 may, for example, be operable to upconvert baseband signals to RF signals and amplify RF signals. In various aspects of the subject technology, the transmitter 630 may be operable to upconvert and amplify baseband signals processed in accordance with a variety of wireless standards. Examples of such standards may include Wi-Fi, WiMAX, BT, and various cellular standards. In various aspects of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer 612 may be operable in multiple frequency bands of various wireless standards.

The baseband processing module 640 may comprise suitable logic, circuitry, interfaces, and/or code that may be operable to perform the processing of baseband signals. The baseband processing module 640 may, for example, analyze received signals and generate control and/or feedback signals for configuring various components of the wireless communication device 600, such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control the transfer of data between various portions of the wireless communication device 600. Additionally, the processor 660 may enable implementation of an operating system or otherwise execute code to manage operations of the wireless communication device 600. In one or more implementations, the processor 660 may be interfaced with the IMU 680, UWB/radar sensor 682, Wi-Fi/BT sensors 684 and the ultrasonic (US) transducer 686 via standard host interface technologies such as an inter-integrated circuit (I2C), a serial interface protocol (SPI), a peripheral component interconnect express (PCIE), a universal asynchronous receiver-transmitter (UART) and/or other interface technologies, depending on the data rate needed to sample and pipe from the sensors to the processor 660.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various aspects of the subject technology, information stored in the memory 650 may be utilized for configuring the receiver 620 and/or the baseband processing module 640.

The LOGEN 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is designed to receive signals. Wireless signals may be received via the RF antenna 610, amplified, and downconverted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 600, data to be stored to the memory 650, and/or information affecting and/or enabling operation of the wireless communication device 600. The baseband processing module 640 may modulate, encode, and perform other processing on audio, video, and/or control signals to be transmitted by the transmitter 630 in accordance with various wireless standards.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Various functions described above can be implemented in digital electronic circuitry, as well as in computer software, firmware or hardware. The techniques can be implemented by using one or more computer program products. Programmable processors and computers can be included in or packaged as mobile devices. The processes and logic flows can be performed by one or more programmable processors and by one or more programmable logic circuitries. General and special-purpose computing devices and storage devices can be interconnected through communication networks.

Some implementations include electronic components such as microprocessors and storage and memory that store computer program instructions in a machine-readable or computer-readable medium (alternatively referred to as computer-readable storage media, machine-readable media, or machine-readable storage media). Some examples of such computer-readable media include RAM, ROM and flash memory. The computer-readable media can store a computer program that is executable by at least one processing unit and include sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multicore processors that execute software, some implementations are performed by one or more integrated circuits such as application-specific integrated circuits (ASICs) or field-programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For the purposes of the specification, the terms "display" or "displaying" mean displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback such as visual feedback, auditory feedback, or tactile feedback. Input from the user can be received in any form, including acoustic, speech, or tactile input.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, flash drives, RAM chips, hard drives and EPROMs. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as subparts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of an example approach. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects, and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations, and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for," or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

What is claimed is:

1. A system comprising:
   a reference device;
   a measurement device configured to provide a three-dimensional (3-D) point map comprising a plurality of measured 3-D points that respectively correspond to first positions of a plurality of selected points at different locations on a torso of a user; and
   a processor configured to determine a shape of the torso corresponding to the plurality of measured 3-D points of the 3-D point map,
   wherein the measurement device is moved between the different locations on the torso of the user and placed on respective ones of the plurality of selected points to obtain the 3-D point map.

2. The system of claim 1, wherein the reference device comprises a portable communication device including one of a smartphone, a smartwatch, azo earbud, an earbud case and an airtag.

3. The system of claim 1, wherein the reference device is worn on or held by the user.

4. The system of claim 3, wherein the reference device is located at a fixed location that is proximate to the user.

5. The system of claim 1, wherein the reference device is configured to communicate a second position associated with a location in 3-D space of the reference device to the measurement device.

6. The system of claim 1, wherein the measurement device comprises a portable communication device including one of a smartphone, a smartwatch, an earbud, an earbud case and an airtag.

7. The system of claim 1, wherein the processor is configured to determine a volume of the torso based on the determined shape of the torso.

8. The system of claim 1, further comprising an acoustic device configured to measure a length of a limb of the user by determining an acoustic time-of-flight (TOF) of an acoustic signal.

9. The system of claim 1, wherein the measurement device includes a radiofrequency (RF) transceiver configured to measure a length of a limb of the user by determining an RF time-of-flight (TOF) of an RF signal.

10. The system of claim 1, wherein the 3-D point map represents the first positions of the plurality of selected points relative to a second position associated with a location in 3-D space of the reference device.

11. The system of claim 1, wherein the 3-D point map comprises a set of data points indicating a direction of movement of the measurement device relative to the reference device, wherein the set of data points correspond to the plurality of selected points.

12. A method comprising:
receiving, by a measurement device, a first position of a reference device;
providing, by the measurement device, a 3-D point map comprising a plurality of measured 3-D points that respectively correspond to second positions of a plurality of selected points at different locations on a torso of a user; and
determining, by a processor, a shape of the torso corresponding to the plurality of measured 3-D points of the 3-D point map,
wherein:
the measurement device is moved between the different locations on the torso of the user and placed on respective ones of the plurality of selected points to obtain the 3-D point map, and
the 3-D point map represents the second positions of the plurality of selected points relative to the first position associated with a location in 3-D space of the reference device.

13. The method of claim 12, wherein either of the reference device or the measurement device comprises a portable communication device including one of a smartphone, a smartwatch, an earbud, an earbud case and an airtag.

14. The method of claim 12, further comprising using an acoustic device to measure a length of a limb of the user by determining an acoustic time-of-flight (TOF) of an acoustic signal.

15. The method of claim 12, further comprising using an RF transceiver of the measurement device to measure a length of a limb of the user by determining an RE time-of-flight (TOF) of an RF signal.

16. The method of claim 12, further comprising storing 3-D point-map data and filtering the 3-D point-map data to remove outlier signals due to measurement noise and/or measurement imperfection.

17. The method of claim 16, further comprising preparing, by the processor, a boundary mesh consisting of a set of triangles based on the filtered 3-D point map data, the set of triangles representing a surface enclosed by the plurality of measured 3-D points, the boundary mesh indicating one or more mesh segments within the filtered 3-D point map data.

18. The method of claim 17, further comprising performing, by the processor, a convex hulls decomposition by forming a set of convex hulls based on the boundary mesh.

19. The method of claim 18, further comprising performing, by the processor, a convex hulls volume estimation by summing up volume estimates of each convex hull.

20. The method of claim 19, further comprising determining, by the processor, the shape and a volume of the torso based on the convex hulls volume estimation.

21. A system comprising:
a first portable communication device placed in a first position;
a second portable communication device moved between different locations on a torso of a user and placed on a plurality of positions at respective ones of the different locations on the torso of the user to obtain a three-dimensional (3-D) point map comprising a plurality of measured 3-D points and configured to receive the first position from the first portable communication device and provide the 3-D point map representing second positions of the plurality of positions on the torso relative to the first position; and
a processor configured to determine a shape and a volume of the torso corresponding to the plurality of measured 3-D points of the 3-D point map.

22. The system of claim 21, wherein:
the first portable communication device is worn or held by the user or is placed at a fixed location that is proximate to the user,
the second portable communication device includes an acoustic device configured to measure a length of a limb of the user by determining an acoustic time-of-flight (aw) of an acoustic signal, and
the second portable communication device includes an RF transceiver configured to measure the length of the limb of the user by determining an RF TOF of an RF signal.

* * * * *

UNITED STATES PATENT AND TRADEMARK OFFICE
CERTIFICATE OF CORRECTION

| | | |
|---|---|---|
| PATENT NO. | : 11,796,312 B2 | Page 1 of 1 |
| APPLICATION NO. | : 17/482319 | |
| DATED | : October 24, 2023 | |
| INVENTOR(S) | : Wegene H. Tadele et al. | |

It is certified that error appears in the above-identified patent and that said Letters Patent is hereby corrected as shown below:

In the Specification

Column 3, Line 53:
"designated locations 320" should read:
--designated locations 230--.

In the Claims

Column 10, Line 45 (Claim 2):
"azo earbud" should read:
--an earbud--

Column 11, Line 45 (Claim 15):
"by determining an RE" should read:
--by determining an RF--

Column 12, Lines 40-41 (Claim 22):
"time-of-flight (aw)" should read:
--time-of-flight (TOF)--

Signed and Sealed this
Fifth Day of December, 2023

Katherine Kelly Vidal
*Director of the United States Patent and Trademark Office*